United States Patent
Yanagi

(10) Patent No.: US 6,229,585 B1
(45) Date of Patent: May 8, 2001

(54) LIQUID CRYSTAL DISPLAY UNIT HAVING LIGHT ON ONE SUBSTRATE ILLUMINATING EDGE OF OTHER

(75) Inventor: Masahiro Yanagi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/294,717

(22) Filed: Apr. 20, 1999

(51) Int. Cl.[7] .................................................. G02F 1/1335
(52) U.S. Cl. ................................. 349/65; 349/158; 362/31
(58) Field of Search ....................... 349/65, 158; 362/26, 362/31

(56) References Cited

U.S. PATENT DOCUMENTS 4,011,001 * 3/1977 Moriya .

4,549,819 * 10/1985 Muramoto et al. .................... 349/61
5,852,483 * 12/1998 Newstead et al. ..................... 349/62

FOREIGN PATENT DOCUMENTS 5-313181 * 11/1993 (JP) ....................................... 349/65

* cited by examiner

Primary Examiner—Kenneth Parker
(74) Attorney, Agent, or Firm—Morgan, Lewis & Bockius LLP

(57) ABSTRACT

A back light type liquid crystal display unit comprises a first transparent substrate having, a second transparent substrate on which the first transparent is superposed to enclose liquid crystal therebetween such that a first side end face thereof is protruded from a first side end face of the first transparent substrate to constitute a protruding portion, and at least one light-emitting element disposed on the protruding portion for emitting light to be incident into the first transparent substrate from the first side end face thereof.

13 Claims, 1 Drawing Sheet

LIQUID CRYSTAL DISPLAY UNIT HAVING LIGHT ON ONE SUBSTRATE ILLUMINATING EDGE OF OTHER

BACKGROUND OF THE INVENTION

The present invention relates to a structure of a back light type liquid crystal display unit in which a liquid crystal display device is composed of two transparent substrates between which liquid crystal is enclosed, wherein a light source for emitting light to transmit the device is arranged on the back face thereof and a light-emitting diode is used for the light source of the back light.

As well known, a back light type liquid crystal display unit, in which light-emitting diodes are used, is composed as follows. A liquid crystal display device is composed of two transparent substrates, which are superposed on each other, and liquid crystal is enclosed therebetween. On the back face of the device, there is provided a light guide plate, on the back face of which a light-shielding plate adheres. At least on one peripheral end surface of the light guide plate, at least one light-emitting diode chip is arranged so that beam of light emitted therefrom can be directed to the inside of the light guide plate, and light is emitted from the overall surface of the light guide plate toward the liquid crystal display device.

However, the following problems may be encountered in the related back light type liquid crystal display unit. On the back of a liquid crystal display device, there is provided a light guide plate having one or a plurality of light-emitting diode chips. Accordingly, thickness of the back light type liquid crystal display unit is increased because of the light guide plate arranged on the back face of the liquid crystal display device. Further, it is necessary to provide electrical connection members for connecting both the liquid crystal display device and the light guide plate to the outside. As a result, the size of the related back light type liquid crystal display unit is remarkably increased and further weight thereof is also increased. Furthermore, the cost is greatly raised because the number of parts is large and also the number of electrical connecting sections are large.

SUMMARY OF THE INVENTION

It is therefore an object of the present invention to provide a structure of a back light type liquid crystal display unit by which the above problems can be solved.

In order to achieve the above object, there is provided a back light type liquid crystal display unit comprising: a first transparent substrate having; a second transparent substrate on which the first transparent is superposed to enclose liquid crystal therebetween such that a first side end face thereof is protruded from a first side end face of the first transparent substrate to constitute a protruding portion; and at least one light-emitting element disposed on the protruding portion for emitting light to be incident into the first transparent substrate from the first side end face thereof.

In the display unit, the first transparent substrate may have a longitudinal dimension longer than that of the second transparent substrate for the protruding portion.

In the above structure, light emitted from the light emitting element propagates inside of the second transparent substrate while being reflected by inner faces thereof. Accordingly, the entire face of the second transparent substrate emits light at once and functions as a back light.

Since one of the two transparent substrates composing a liquid crystal display device functions as a light source of back light, unlike the related liquid crystal display device, it is possible to omit a light guide plate, which is used as a light source of back light, to be arranged on the back face of the liquid crystal display device. Therefore, the size and weight of the liquid crystal display device according to the present invention can be reduced, and thereby the cost can be reduced beyond all comparison.

The display unit further a reflection plate covering a second side end face of the first transparent substrate opposed to the first side end face thereof and a second side end face of the second transparent substrate opposed to the first side end face thereof.

Thereby, it is possible to prevent the leakage of light from the second end faces by the reflecting plate. Accordingly, the efficiency of using light can be enhanced.

The display unit further comprises a synthetic resin portion provided on the protruding portion so as to cover the light emitting element and the first side end face of the first transparent substrate, the synthetic resin portion has a refractive index substantially equal to that of glasses.

Accordingly, the light emitting element is insulated from the atmosphere, so that the durability can be enhanced, and further a quantity of light sent from the light emitting element to the second transparent substrate can be increased.

In the display unit, the light emitting element may be a light-emitting diode array arranged in a row on the protruding portion along the first side face of the first transparent substrate.

Accordingly, it is possible to cancel the characteristic unevenness of the light-emitting diodes in a direction along the first side face of the first transparent substrate. Thereby, the back light can be distributed uniformly.

The display unit may further comprise light scattering means on a surface of the first side end face of the first transparent substrate.

For example, the light scattering means may be fine irregularities provided on the surface of the first side end face of the first transparent substrate.

The surface of the first side end face of the first transparent substrate may be polished to form the irregularities.

Accordingly, since a quantity of the light emitted from the light emitting element is scattered and made even with respect to the incident face, the back light can be distributed uniformly.

The display unit may further comprises light scattering means on at least one of an upper surface of the first transparent substrate, a lower surface of the same, an upper surface of the second transparent substrate and a lower surface of the same.

For example, the light scattering means may be fine irregularities provided on at least one of an upper surface of the first transparent substrate, a lower surface of the same, an upper surface of the second transparent substrate and a lower surface of the same.

At least one of an upper surface of the first transparent substrate, a lower surface of the same, an upper surface of the second transparent substrate and a lower surface of the same may be polished to form the irregularities.

In the display unit, a circuit section for driving the display unit is disposed on the protruding portion.

Accordingly, the thickness of the device can be remarkably reduced.

The circuit section includes first terminal electrodes connected to transparent electrodes respectively provided on the first and second transparent substrates and second terminal electrodes connected to the light emitting element. The first and second terminal electrodes are arranged juxtaposedly on the protruding portion.

Accordingly, the terminal electrodes are integrally connected to an external device via a flat flexible cable for instance. Therefore, the electrical connection can be greatly simplified and it is thereby possible to further reduce the size and weight, and also it is possible to reduce the cost.

DETAILED DESCRIPTION OF THE PREFERRED EMBODIMENTS

Figure 1:
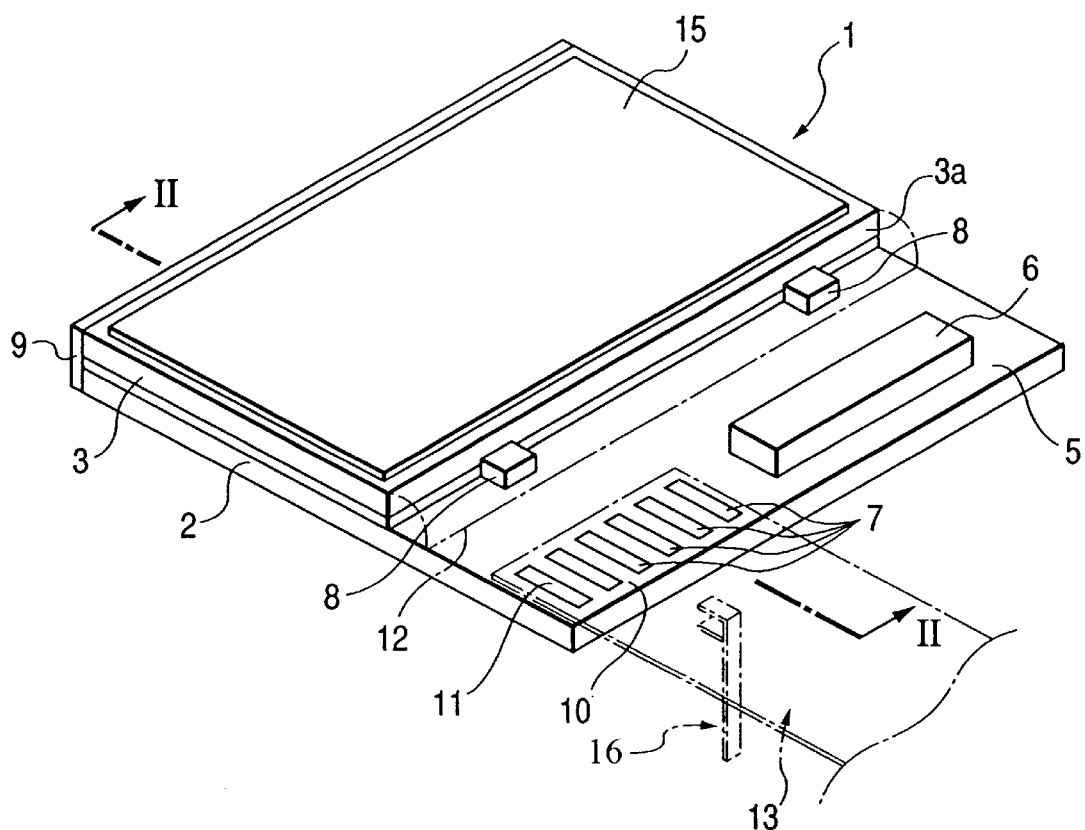
FIG. 1 is a perspective view showing an embodiment of a liquid crystal display unit according to the present invention.
Figure 2:
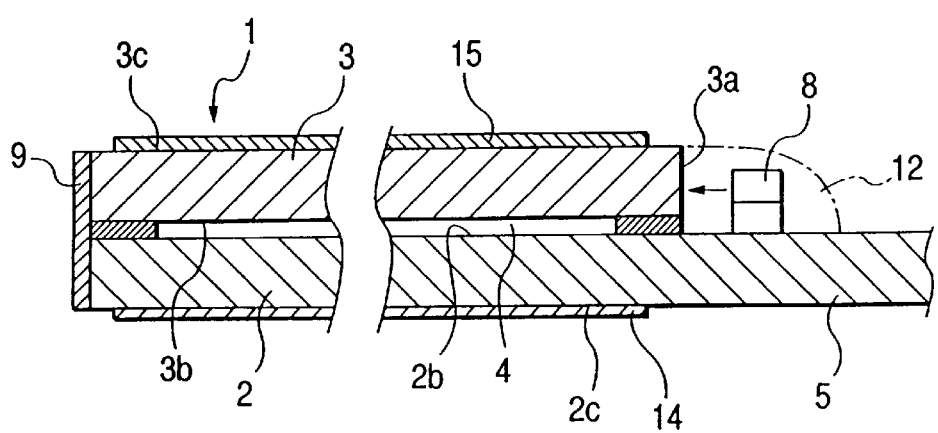
FIG. 2 is a cross-sectional view taken along the line II—II in FIG. 1.

Referring to FIGS. 1 and 2, an embodiment of the present invention will be described below in detail.

In these drawings, reference numeral 1 is a liquid crystal display device. This liquid crystal display device 1 is composed of two transparent substrates 2 and 3 made of glass between which liquid crystal 4 is enclosed. At one end portion of a first transparent substrate 2, there is integrally provided a protruding portion 5 which protrudes outside from one end face 3a of a second transparent substrate 3.

Polarizing films 14 and 15 are adhered onto both the surface of the first and second transparent substrates 2 and 3, respectively.

In this case, the end face 3a of the second transparent substrate 3 is formed into a surface having fine irregularities like a polished surface of glass. The irregularities are formed, for example, by polishing the surface.

IC chips 6 used for the transparent electrodes (not shown) of both the transparent substrates 2 and 3 are mounted on the surface of the protruding portion 5 of the first transparent substrate 2. Further, a plurality of terminal electrodes 7 used for the IC chips 6 are arranged in parallel to each other on the surface of the protruding portion 5.

At least one light-emitting diode chip 8 is arranged where is on the surface of the protruding portion 5 of the first transparent substrate 2 being adjacent to the end face 3a of the second transparent substrate 3 in such a manner that the beams of light emitted from the light-emitting diode chips 8 are directed toward the inside of the second transparent substrate 3 from the end face 3a thereof. Further, a reflecting plate 9 is provided so as to cover the other end faces of both the transparent substrates 2 and 3.

The terminal electrodes 10 and 11 used for supplying electric power to the light-emitting diode chips 8 are arranged on the surface of the protruding portion 5 of the first transparent substrate 2 in such a manner that they are placed sideways in parallel to the terminal electrodes 7 for the transparent electrodes of the liquid crystal display device 1.

Furthermore, synthetic resin 12 having refractive index which is substantially equal to that of glasses is molded on the surface of the protruding portion 5 of the first transparent substrate 2 so as to cover the light-emitting diode chips 8 and the end face 3a of the second transparent substrate 3.

In the above structure, beams of light emitted from the light-emitting diode chips 8 propagate inside of the second transparent substrate 3 while being reflected by inner faces thereof. Accordingly, the entire face of the second transparent substrate 3 emits light and functions as a back light.

At least one surface of an upper face 2b of the first transparent substrate 2, a lower face 2c of the same, a lower face of the second transparent substrate 3 and an upper face of the same may be formed into a surface having fine irregularities like a polished surface of glass. The irregularities are formed, for example, by polishing the surface. Accordingly, the light emitted from the second transparent substrate 3 is scattered and thereby the back light effect can be enhanced.

As the reflecting plate 9 is provided so as to cover the other end faces of both the transparent substrates 2 and 3, it is possible to prevent the leakage of light therefrom. Accordingly, the efficiency of using light can be enhanced.

As the synthetic resin 12 having refractive index which is substantially equal to that of glasses is molded on the surface of the protruding portion 5 of the first transparent substrate 2 so as to cover the light-emitting diode chips 8 and the end face 3a of the second transparent substrate 3, the light-emitting diode chips 8 are shut off from the atmosphere, so that the durability can be enhanced, and further a quantity of light, which is sent from the light-emitting diode chips 8 to the second transparent substrate 3, can be increased.

As the end face 3a of second transparent substrate 3 is formed into a surface having fine irregularities like a polished surface of glass, a quantity of the light emitted from each light-emitting diode chip 8 at each incident position are scattered and made even. Accordingly, the back light can be distributed uniformly.

In addition, as the terminal electrodes 10 and 11 used for supplying electric power to the light-emitting diode chips 8 are arranged on the surface of the protruding portion 5 of the first transparent substrate 2 in such a manner that they are placed sideways in parallel to the terminal electrodes 7 for the transparent electrodes of both the transparent substrates 2 and 3, it is possible to connect flexible cables 13 to the terminal electrodes 7 for the transparent electrodes of both the transparent substrates 2 and 3 as illustrated by in FIG. 1, and at the same time, the electric power source can be connected to the terminal electrodes 10 and 11 of the light-emitting diode chips 8 via the flexible cables 13.

As illustrated by chain double-dashed lines in FIG. 1, a plurality of connection lead pins 16 used for connection are arranged at one end portion of the protruding portion 5 of the first transparent substrate 2 so that the lead pins 16 can be connected to the terminal electrodes 7 for the transparent electrodes of both the transparent substrates 2 and 3 and so that the lead pins 16 can be connected to the terminal electrodes 10 and 11 for the light-emitting diode chips 8. Therefore, the liquid crystal display device 1 can be electrically connected to a printed board via the lead pins 16.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A back light type liquid crystal display unit comprising:
   a first transparent substrate having;
   a second transparent substrate on which the first transparent is superposed to enclose liquid crystal therebetween such that a first side end face thereof is protruded from a first side end face of the first transparent substrate to constitute a protruding portion; and at least one light-emitting element disposed on the protruding portion for emitting light to be incident into the first transparent substrate from the first side end face thereof.

2. The liquid crystal display unit as set forth in claim 1, further comprising:

a reflection plate covering a second side end face of the first transparent substrate opposed to the first side end face thereof and a second side end face of the second transparent substrate opposed to the first side end face thereof.

3. The liquid crystal display unit as set forth in claim 1, further comprising:

a synthetic resin portion provided on the protruding portion so as to cover the light emitting element and the first side end face of the first transparent substrate, the synthetic resin portion having a refractive index substantially equal to that of glasses.

4. The liquid crystal display unit as set forth in claim 1, wherein the light emitting element is a light-emitting diode array arranged in a row on the protruding portion along the first side face of the first transparent substrate.

5. The liquid crystal display unit as set forth in claim 1, further comprising:

light scattering means on a surface of the first side end face of the first transparent substrate.

6. The liquid crystal display unit as set forth in claim 5, wherein the light scattering means is fine irregularities provided on the surface of the first side end face of the first transparent substrate.

7. The liquid crystal display unit as set forth in claim 6, wherein the surface of the first side end face of the first transparent substrate is polished to form the irregularities.

8. The liquid crystal display unit as set forth in claim 1, further comprising:

light scattering means on at least one of an upper surface of the first transparent substrate, a lower surface of the same, an upper surface of the second transparent substrate and a lower surface of the same.

9. The liquid crystal display unit as set forth in claim 8, wherein the light scattering means is fine irregularities provided on at least one of an upper surface of the first transparent substrate, a lower surface of the same, an upper surface of the second transparent substrate and a lower surface of the same.

10. The liquid crystal display unit as set forth in claim 9, wherein at least one of an upper surface of the first transparent substrate, a lower surface of the same, an upper surface of the second transparent substrate and a lower surface of the same is polished to form the irregularities.

11. The liquid crystal display unit as set forth in claim 1, wherein a circuit section for driving the display unit is disposed on the protruding portion.

12. The liquid crystal display unit as set forth in claim 11, wherein the circuit section includes first terminal electrodes connected to transparent electrodes respectively provided on the first and second transparent substrates and second terminal electrodes connected to the light emitting element, and wherein the first and second terminal electrodes are arranged juxtaposedly on the protruding portion.

13. The liquid crystal display unit as set forth in claim 1, wherein the first transparent substrate has a longitudinal dimension longer than that of the second transparent substrate for the protruding portion.

\* \* \* \* \*